Figure 1:
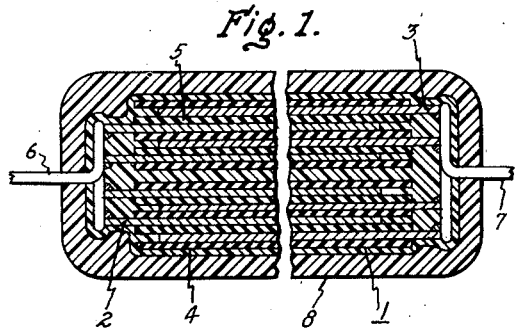
Figure 2:
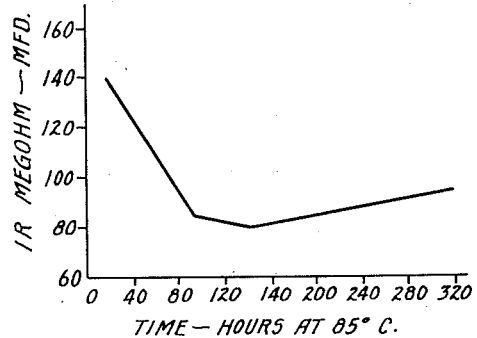
Figure 3:
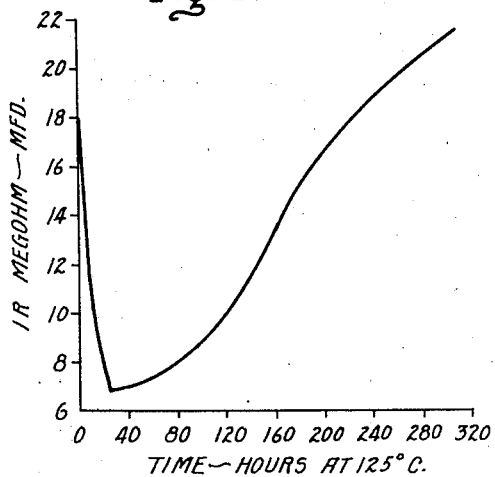
Figure 4:
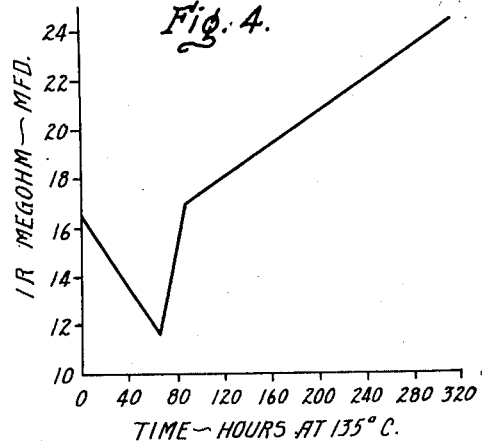
Figure 5:
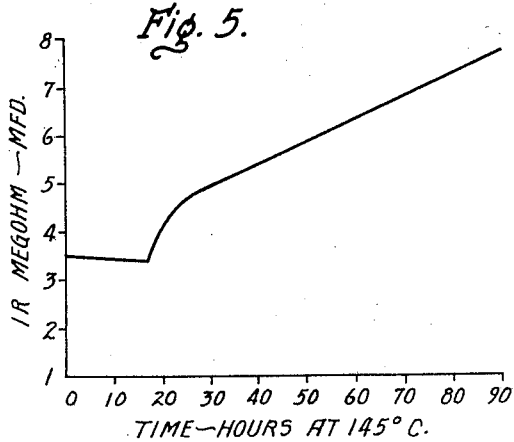
Figure 6:
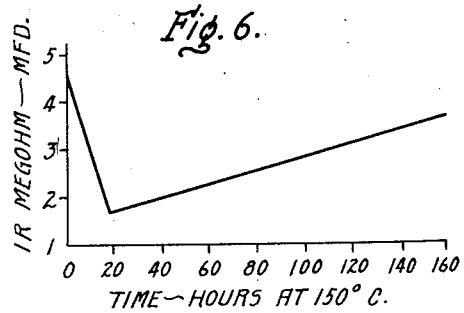

Inventors
Alfred S. Cummin,
John R. Hutzler,
Richard Graham, Jr.
by Gilbert P. Tarleton
Their Attorney.

United States Patent Office 2,819,492
Patented Jan. 14, 1958

2,819,492

ELECTRICAL CAPACITOR AND METHOD OF MAKING THE SAME

Alfred S. Cummin, Glen Falls, John R. Hutzler, Fort Edward, and Richard Graham, Jr., Hagaman, N. Y., assignors to General Electric Company, a corporation of New York Application October 20, 1955, Serial No. 541,662

15 Claims. (Cl. 18—47.5)

The present invention relates to electrical capacitors, and more particularly to the type of electrical capacitors which are encased and sealed in an outer shell of a molded or otherwise applied resinous material, and an improved method of making the same.

The encasing of capacitors in a molded synthetic resin jacket is well known in the prior art for the purposes of providing better insulation, resistance to moisture and protection generally for the inner capacitor assembly of armatures and dielectric material. In molded capacitors as heretofore conventionally made, the inner capacitor assembly or body which may take the form of a roll of stack of alternating conducting and dielectric sheets is encased in a molded outer shell of a thermosetting resin, such as a phenol formaldehyde or phenol-aniline-formaldehyde condensation product. In the process of molding and curing the resinous shell, the resin-covered capacitor unit is subjected to high temperature and pressure. A disadvantage encountered in the prior types of molded capacitors is the lowered insulation resistance produced by the molding operation. This difficulty is probably due to diffusion into the capacitor roll of decomposition products from the molding compound, e. g., water and ammonia. Such units, furthermore, are subject to even lower insulation resistance when subsequently heated for short periods of time, as for example to cure dielectric impregnant in the capacitor roll which is often introduced into the roll through an opening left in the molded casing, since the decomposition products continue to be evolved from the heated resin casing. Moreover, while such molded capacitors may initially have a satisfactory insulation resistance, they undergo a gradually lessening insulation resistance under operational conditions of elevated temperature.

It is an object of the present invention to provide resin encapsulated tubular capacitors having improved and more stable insulation resistance characteristics, as well as improved life and resistance to moisture, and a method of making such improved encapsulated capacitors.

In accordance with the invention in its broad aspects the improved capacitors are obtained by an extended heat treatment or heat-aging of plastic encased, impregnated capacitor units at a temperature range of about 50° C.–180° C. for a period of about 2000 to 30 hours. It has been found that the insulation resistance achieved as the result of such extended heat-aging is generally equal to or higher than the initial insulation resistance of the unit before the jacket-molding operation, and is moreover established at a stable value which is maintained even under extreme operational conditions.

The invention will be better understood from the following description taken in conjunction with the accompanying drawing, in which:

Fig. 1 is a sectional view of a molded tubular capacitor produced in accordance with the invention;

Figs. 2–6 graphically illustrate the improved insulation resistance obtained in capacitors by the present process.

Referring now to the drawing, and particularly to Fig. 1, there is shown a tubular resin-encapsulated capacitor of the type to which the present invention is applicable. The capacitor includes an inner assembly or body 1 composed of a convolutely wound roll of alternately arranged metallic foils or armatures 2, 3 and dielectric spacer sheets 4, 5. The metallic foils 2, 3 may be of any suitable conductive material such as tin or aluminum, while the spacer sheets 4, 5 may be kraft paper, films of polyethylene terephthalate, polystyrene, or polyethylene, or other known dielectric spacer material. The spacer sheets are preferably porous in order to absorb and retain the dielectric liquid impregnant applied thereto. The dielectric impregnant may be a liquid such as mineral oil or chlorinated diphenyl, but is preferably a polymerizable synthetic resin of known or conventionally used type as described more fully below. In addition to permeating the spacer material 4, 5, the impregnant in the form of a coating fills the space between the capacitor roll 1 and the resin casing 8. Foils 2, 3 preferably project in opposite directions beyond the dielectric sheets 4, 5 at the opposite ends of the roll, and to the respective foil edges axial leads 6, 7, such as tinned copper wires, are attached by any suitable means, e. g., by soldering or welding.

Casing 8 may be composed of any suitable encapsulating thermoplastic or thermosetting resin, but is preferably a thermosetting resin such as a phenol-formaldehyde condensation product and typically is applied and molded around the impregnated capacitor roll 1 by procedures already known in the art using heat and pressure, so as to completely encase and seal the roll. Other specific types of thermosetting molding compounds which may be used are melamine-formaldehyde, urea-formaldehyde and epoxy resins. Examples of suitable thermoplastic molding compounds are polystyrene, polyethylene, acrylates and polytetrafluoroethylene. The molding material may also contain filling material as is known in the art, such as mineral or fibrous fillers. The encapsulation may be carried out by various molding processes, compression molding, for example, with or without heat being ordinarily used for the thermosetting resins, and injection molding usually being employed with the thermoplastic materials and generally with heat. Casting procedures may also be used where appropriate.

Among the synthetic resin substances which may be used to impregnate the dielectric spacer sheets 4, 5 are polymerizable vinyl, divinyl, and polyester compounds, and mixtures, polymers and copolymers thereof. The resins may be applied as liquids and substantially polymerized in situ by use of elevated temperatures and/or suitable catalysts. Examples of such compounds are styrene monomer, diallyl phthalate, ethylene glycol maleate and admixtures thereof, such as styrene monomer with diallyl phthalate. Another example of such compounds is the copolymer of styrene, alpha methyl styrene and divinyl benzene as disclosed in Walker Patent 2,665,400. The resin impregnant employed may be of the thermosetting type such as the resin disclosed by the Walker patent, but is preferably a thermoplastic material having a high softening point and high insulation resistance, such as polyvinylcarbazole. A particularly satisfactory starting material of the latter type is N-vinyl carbazole.

In a typical process in accordance with the invention for making a capacitor of the type described, the capacitor section 1 before impregnation or molding is subjected to a vacuum-drying cycle at a temperature of about 125° C.–135° C. to remove water and other volatile materials, the process being carried on until the moisture content of the capacitor tissue spacer is less than 0.2%. The capacitor section is then impregnated under a vacuum of about 500 microns or less with a vinyl carbazole compound such as N-vinyl carbazole at a temperature of 90° C.–110° C. Residual vacuum is maintained for one or two hours followed by soaking in air for the same period at atmospheric pressure. After removal of the capacitor unit from the impregnating tank the N-vinyl carbazole is polymerized in situ by the application of heat. The heat is applied by means of an air-circulating oven wherein the temperature rises slowly from 25° C.–125° C. in a period of 14 hours and is maintained at 125° C. for a period of 1 to 7 days. Following the polymerization of the impregnated capacitor body the unit is then encapsulated by molding thereon a jacket of phenol-formaldehyde resin, the molding material being a two-stage mica-filled phenolic resin molded at pressures of 1,000 to 2,000 pounds per square inch and the temperatures of 290° F.–360° F. The capacitor section now having been completely encased in a molded thermosetting resin, it is subjected to the heat-aging treatment in accordance with the present invention.

The temperatures of the present heat-aging process vary from 50° C.–180° C. over a period of from 2000 to 30 hours, the particular combination of time and temperature depending on the final insulation resistance desired, the particular molding composition used, the dielectric impregnant employed, and other factors. Temperatures below about 50° C. have not been found suitable because the improved results in IR properties either were not produced at those temperatures or the period of heat-aging required was too long to be practical. Temperatures above about 180° C. proved unsatisfactory since the risk of decomposition of the resin material and the paper spacer was too great under those conditions. Heat-aging at a temperature of about 135° C. for a period in the range of 100–400 hours is a typical practical treatment. The heat-aging of the present process is carried out at atmospheric pressure or higher, it having been found that heat-aging under vacuum does not produce the desired results.

The molded capacitor after the heat-aging process may then, if desired, be further treated by applying a coating of mineral wax thereon in a hot-dip or short vacuum impregnation process.

While the ultimate insulation resistance of the encapsulated capacitor may, in accordance with the present heat-aging process, exceed the initial IR value of the capacitor prior to such treatments, the invention is not limited to achieving such a result. The discovery that during heat aging of the molded units the IR value decreases at first, goes through a minimum point, and then starts to steadily increase as the heat aging continues, is a significant feature of the invention, since it thereby assures that the IR of the capacitor will not drop during normal operational life. The heating process may, for example, be carried out for a sufficient period after the IR minimum point is reached to attain a required IR specification without reaching the initial IR value.

Figs. 2–6 show graphically the results obtained by heat-aging at different temperatures molded tubular capacitors made by a process such as described above and containing a polyvinyl carbazole dielectric impregnant. In the graphs, the insulation resistance of the various capacitor units in megohm-microfarads and as measured at 85 volts D. C. is plotted against the time of heat aging at the respective temperatures indicated. All the curves illustrate the fact that during the heat-aging process the insulation resistance drops initially and after reaching a minimum begins to rise, often to a point higher than the original value. The period of time at which the insulation resistance reaches an acceptable level is dependent on the heat aging temperature. Thus, comparing aging at 125° C. (Fig. 3) with that at 135° C. (Fig. 4), it will be seen that it required about 230 hours of heating at 125° C. for the unit to reach the original insulation resistance value, whereas at 135° C. only about 90 hours was necessary to reach the initial IR value.

Such factors as variations in the composition of the molding compound and the cure time for the capacitor impregnant will affect the heat-aging characteristics of the capacitors, but such variations affect only the rate of initial drop and subsequent increase of insulation resistance and do not essentially change the nature of the improvement produced in accordance with the invention. Although not fully shown on the accompanying graphs, continued heating of the molded capacitor units at the various temperatures has been found generally to level off the insulation resistance to a stable value. The stability thus achieved by an adequate period of heat aging is of advantage in that the elevated temperatures encountered in operational use of the capacitors will not cause any appreciable further change in insulation resistance of the units.

The present process thus provides a means for controlling and stabilizing the final insulation resistance in the product, and ensures that the IR will not drop below the final value obtained. The invention further makes it unnecessary to leave openings or provide eyelets in the casing to allow escape of volatile impurities of moisture and ammonia during the molding process and which must be sealed thereafter. A substantial saving of labor and materials is thereby achieved. By virtue of the present heat-aging process, the capacitors thus treated may have a higher temperature rating and be used under more severe temperature conditions than if not so treated.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of making an encapsulated electrical capacitor which comprises forming a capacitor body having electrodes separated by dielectric material and having conducting leads projecting therefrom; encapsulating the capacitor body with a plastic material so as to completely encase said electrodes and dielectric material thereof; and heating the thus encased capacitor body for a period of at least 30 hours at a temperature of at least 50° C.

2. The method of making an encapsulated electrical capacitor which comprises forming a capacitor body having electrodes separated by dielectric spacing material, said body having conducting leads projecting therefrom; impregnating said capacitor body with a liquid dielectric material; encapsulating the impregnated capacitor body with a plastic material so as to completely encase the same; and heating the thus encased capacitor body for a period of at least 30 hours at a temperature of at least 50° C.

3. The method of making a molded electrical capacitor which comprises forming a capacitor body having electrodes separated by porous dielectric sheet material, said body having conducting leads projecting therefrom; impregnating said capacitor body with a polymerizable liquid dielectric material; curing the polymerizable impregnant in said capacitor body; molding a plastic material about the impregnated capacitor body so as to completely encase the same; and heating the thus encased capacitor body for a period of at least 30 hours at a temperature of at least 50° C.

4. The method of making a molded electrical capacitor which comprises forming a capacitor body having electrodes separated by porous dielectric sheet material, said body having conducting leads projecting therefrom; impregnating said capacitor body with a polymerizable liquid dielectric material; curing the polymerizable impregnant in said capacitor body; molding a plastic material about the impregnated capacitor body so as to completely encase the same; and heating the thus encased capacitor body for a period of at least 30 hours at a temperature of 50° C.–180° C.

5. The method of making a molded electrical capacitor which comprises forming a capacitor body having electrodes separated by porous dielectric sheet material, said body having conducting leads projecting therefrom; impregnating said capacitor body with a polymerizable liquid dielectric material; curing the polymerizable impregnant in said capacitor body; heat-molding a thermosetting resin compound about the impregnated capacitor body so as to completely encase the same; and heating the thus encased capacitor body at a temperature of 50° C.–180° C. for a period of between 2000 and 30 hours.

6. The method as defined in claim 5, wherein said polymerizable dielectric impregnant is a thermoplastic resin.

7. The method as defined in claim 6, wherein said thermoplastic resin impregnant is polyvinyl carbazole and said thermosetting resin molding compound comprises phenol formaldehyde.

8. The method as defined in claim 5, wherein said polymerizable dielectric impregnant is a thermosetting resin.

9. The method as defined in claim 8, wherein said thermosetting resin impregnant is a polyester resin and said thermosetting resin molding compound comprises phenol formaldehyde.

10. The method as defined in claim 8, wherein said thermosetting resin impregnant is a copolymer of styrene, alpha methyl styrene and divinyl benzene, and said thermosetting resin molding compound comprises phenol formaldehyde.

11. In the method of making an electrical capacitor sealed in an outer resin casing, the step of heat aging the encased capacitor by subjecting it to a temperature of 50° C.–180° C. for a period of between 2000 and 30 hours.

12. In the method of making an electrical capacitor incorporating dielectric impregnant and sealed in an outer resin casing, the step of heat aging the encased impregnated capacitor by subjecting it to a temperature of 50° C.–180° C. for a period of between 2000 and 30 hours.

13. The method of improving the insulation resistance properties of a resin-encapsulated dielectric impregnated electrical capacitor which comprises the step of heat aging the encapsulated impregnated capacitor by subjecting it to a temperature of 50° C.–180° C. for a period of between 2000 and 30 hours.

14. An electrical capacitor made by the process as defined in claim 1.

15. An electrical capacitor made by the process as defined in claim 7.

References Cited in the file of this patent
UNITED STATES PATENTS

| | | |
|---|---|---|
| 1,765,032 | Richmond | June 17, 1930 |
| 2,684,317 | Burnham | July 20, 1954 |